(12) United States Patent
Oren et al.

(10) Patent No.: US 6,208,369 B1
(45) Date of Patent: *Mar. 27, 2001

(54) APPARATUS AND METHOD FOR RECORDING AN IMAGE

(75) Inventors: Iian Ben Oren, Jerusalem; Serge Steinblatt, Ra'anana; Amir Komem, Tel Aviv, all of (IL)

(73) Assignee: CreoScitex Corporation Ltd., Herzlia (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,158

(22) Filed: Aug. 14, 1997

(30) Foreign Application Priority Data

Aug. 20, 1996 (IL) .................................................. 119099

(51) Int. Cl.⁷ ..................................................... B41J 15/14
(52) U.S. Cl. ........................... 347/244; 347/239; 347/241
(58) Field of Search .................................... 347/244, 135, 347/136, 239, 240, 255, 234, 241, 248, 256, 134; 346/108; 349/5, 7, 292; 348/196, 756, 781; 359/109

(56) References Cited

U.S. PATENT DOCUMENTS

| | | | |
|---|---|---|---|
| 3,653,067 | * 3/1972 | Anderson et al. | 347/243 |
| 4,308,544 | * 12/1981 | Lucero et al. | 347/255 |
| 4,571,603 | 2/1986 | Hornbeck et al. | 347/239 |
| 4,807,218 | * 2/1989 | Gerber | 347/255 |
| 5,043,743 | * 8/1991 | Habets et al. | 347/239 |
| 5,049,901 | * 9/1991 | Gelbart et al. | 346/108 |
| 5,309,244 | 5/1994 | Katagiri et al. | 347/239 |
| 5,398,082 | 3/1995 | Henderson et al. | 348/781 |
| 5,410,370 | 4/1995 | Janssen | 348/756 |
| 5,416,514 | 5/1995 | Janssen et al. | 348/196 |
| 5,428,467 | 6/1995 | Schmidt | 349/2 |
| 5,450,219 | 9/1995 | Gold et al. | 349/5 |
| 5,457,566 | 10/1995 | Sampsell et al. | 359/392 |
| 5,841,956 | * 11/1998 | Venkateswar et al. | 359/109 |

FOREIGN PATENT DOCUMENTS 2279845  6/1994  (GB) .
1513519 A1  10/1989  (SU) .

* cited by examiner

Primary Examiner—N. Le
Assistant Examiner—Lamson D. Nguyen
(74) Attorney, Agent, or Firm—Eitan, Pearl, Latzer & Cohen-Zedek

(57) ABSTRACT

An imaging system for imaging a plurality of macropixels onto a media and a method for generating a linear array of macropixels to be imaged onto a media utilizing a two dimensional spatial light modulator having a plurality of micropixels grouped together to form a plurality of linear arrays of macropixels is provided. The imaging system includes a light source for generating a beam of light; a projection lens assembly for focusing the beam of light; a deflector illuminated by the light beam output from the projection lens assembly, the deflector able to deflect the light beam in the vertical (Y-axis) direction; an anamorphic lens assembly illuminated with the light beam output from the deflector; a two dimensional spatial light modular (SLM) including a plurality of micropixels, the plurality of micropixels grouped together to form a plurality of linear arrays of the micropixels, and an imaging lens assembly coupled to the output of the spatial light modulator. The spatial light modulator controls the passage of light through each of the macropixels, the linear arrays being illuminated one at a time in sequential order. The imaging lens assembly images onto the media, a line spot on the deflector in the vertical (Y-axis) direction and the output of the spatial light modulator in the horizontal (X-axis) direction.

28 Claims, 6 Drawing Sheets

APPARATUS AND METHOD FOR RECORDING AN IMAGE

FIELD OF THE INVENTION

The present invention relates to imaging systems in general and more particularly to the application of two dimensional spatial light modulators (SLM) for linear array imaging.

BACKGROUND OF THE INVENTION

Currently, imaging systems are manufactured using one of several different technologies. One of these technologies includes modulating the energy output from a laser light source using an acousto-optic modulator. The modulated laser light is scanned over the image plane, which is fixed to an internal drum, to form the resultant image.

Alternately, the energy output from a laser light source is modulated by an acousto-optic modulator and imaged onto an external rotating drum. The optical head is moved synchronously with the rotation of the drum in the direction parallel to the drum axis.

The above two mentioned technologies can be slightly varied by using a laser diode that is modulated directly rather than via an acousto-optic modulator. All the above disclosed technologies suffer from various limitations. One such limitation is the limit placed on the imaging speed due to the mechanical limitations on the drum or spinner rotation speed.

The imaging speed of an imagesetter is an important factor today in light of resent technological advances in media technology. Many image processes are moving from a film based media to plate based media. The reasons for this are that the new plate technology does not require processing with hazardous chemicals thus eliminating the environmentally unfriendly development process required to process film based media and because a major step in the pre-press process can be eliminated. These new materials, however, require more power per dot for proper exposure, thus increasing the power required for a fixed exposure time.

Many imaging systems today utilize some type of light value or spatial light modulator (SLM) to generate an image onto the media. The majority of the SLM arrays used today are 1-dimensional. In addition, the industry is perpetually striving to reduce the imaging or printing time. The pace that current imaging systems operate at are too slow to achieve these short imaging times. More specifically, the problem lies in the write cycle times of the 1-dimensional SLM arrays used in many of the systems today. These devices are too slow to handle the high data rates needed to achieve such short imaging times.

In addition, SLM arrays based on ferroelectric liquid crystal (FLS)or digital mirror device (DMD) modulators suffer from a limitation in their control of the level of light passing through them since they are bistable devices.

Various schemes for generating and forming an image on a media are taught in the following prior art references. U.S. Pat. No. 4,571,603, issued to Hornbeck et al., teaches an image projection system for producing a projected image in response to electrical signals representing the image to be projected. The electrical signals are transmitted to a light modulator receiving light from an external source. The modulator comprises arrays of deformable mirrors that selectively deflect the light from the external source in response to the electrical signals.

U.S. Pat. No. 5,049,901, issued to Gelbart, teaches a light modulator for imaging a light source onto a two dimensional light valve. The light valve is imaged onto a light sensitive material and the image is scanned along the light sensitive material. The image is input to the first row and transferred to consecutive rows in synch with the movement of the material so that the imaged data is stationary relative to the exposed material.

U.S. Pat. No. 5,309,244, issued to Katagiri et al., teaches an image processing apparatus having a spatial light modulator that is both written to and read from. A laser is moved in two dimensions and illuminates the spatial light modulator. The digital reading and writing system includes a hologram disk having hologram lenses located in a concentric or spiral manner and arranged to deflect the laser beam vertically and horizontally for scanning the spatial modulating element.

U.S. Pat. No. 5,398,082, issued to Henderson et al., teaches a video projection system employing a reflective light value that is optically addressed by an image from a cathode ray tube and provides an output image for projection by means of a high intensity reading light directed to the output face of the liquid crystal light valve. Improved reading illumination is achieved by scanning the face of the liquid crystal light valve with a narrow beam of light that moves across the liquid crystal is synch with the scanning image from the writing cathode ray tube.

U.S. Pat. No. 5,410,370, issued to Janssen, teaches a color projection video system that utilizes a single light valve. A white light source is separated into red, green and blue components. Scanning optics in the form of three prisms cause the RGB bands to be sequentially scanned across a light valve, such as a transmission LCD panel. A particular row is addressed by display electronics with the appropriate color content of that portion of the image which is being displayed, prior to each color passing over a given row of panels on the light valve. The image is then projected by a lens onto a viewing surface, such as a screen.

U.S. Pat. No. 5,416,514, issued to Hanssen et al., teaches a color projection system that utilizes a single light valve. A white light source is separated into red, green and blue components. Scanning optics in the form of three prisms cause the RGB bands to be sequentially scanned across a light valve, such as a transmission LCD panel. A particular row is addressed by display electronics with the appropriate color content of that portion of the image which is being displayed, prior to each color passing over a given row of panels on the light valve. The image is then projected by a lens onto a viewing surface, such as a screen. Also taught is circuitry to synchronize the illumination of the light valve with the video signal and to minimize video breakup when changing video sources.

U.S. Pat. No. 5,428,467, issued to Schmidt, teaches a projection system employing a reflective light valve that is optically addressed by an image from the cathode ray tube and provides an image for projection by means of a high intensity reading light from a lamp. Reading illumination is provided by scanning the face of the liquid crystal light valve with a narrow beam of light that moves across the liquid crystal light valve face in synch with the scanned image from the writing cathode ray tube. The scanned narrow band of illumination is provided by refractive transmission through a rotating transparent polygonal body. Rotation of the polygonal body is synchronized with the vertical sync of the CRT.

U.S. Pat. No. 5,450,219, issued to Gold et al., teaches a telecentric illumination scanning system that comprises an input lens, a rotatable or oscillating reflective scanner, and output lens and a polarizing element. The input lens transmits light from a light source to the scanner, which is then reflected and directed to the output lens. The light transmitted by the output lens is polarized and applied to the light valve. Light is focused into a relatively narrow band of light that is scanned by the rotatable or oscillating scanner across the face of the light valve.

U.S. Pat. No. 5,457,566, issued to Sampsell et al., teaches an optical scanning system comprising a spatial light modulator with minimum diffraction effects that can be scanned by line. Also included is a suitable detector and suitable optics. Applications include infrared and photocopying.

Soviet Union Patent No. 1513519 teaches a device for retrieving data from a movable holographic memory. The device comprises a light beam shaper, a movable array of holograms optically coupled via a restoring lens to a two dimensional spatial light modulator and a multi-element photo-receiver, the output of which is coupled to the input of a data processing unit.

SUMMARY OF THE INVENTION

Accordingly, it is an object of the present invention to provide an improved imaging system for performing fast linear array imaging in one dimension.

Another object of the present invention is to provide an imaging system that performs fast linear array imaging in one dimension utilizing a two dimensional spatial light modulator.

It is another object of the present invention to provide an imaging system that is capable of imaging a range of gray scales for each pixel.

One solution to overcome the problems of the prior art is to use a single strong light source and a fast enough light valve that is controlled electronically. The light valve is imaged onto a rotating drum so as to transfer the image onto the recording medium. Various type of light valves may be used in the present invention, they include, but are not limited to, digital mirror devices (DMDs), membrane mirror light modulator (MLM) arrays, deformable mirror devices (DeMDs), liquid crystal arrays (LCs) and ferroelectric liquid crystal (FLC) arrays. All these devices are known collectively as spatial light modulators (SLMs).

The present invention overcomes the problem of slow 1-dimensional SLM array devices by employing a 2-dimensional SLM array but imaging only one row at a time onto the medium. While a particular 1-dimensional linear row is being imaged, the previously imaged rows are being written to with the following data to be imaged. Another feature of the present invention includes providing the ability to apply a gray scale for each imaged pixel. Rather than having simply an on or off valve for each pixel, a range of gray scales can be imaged. This permits calibrating the imaging system to achieve uniform illumination, for example, and also permits the generation of finer gray scale images.

Another feature of the present invention is the decrease in the average power per pixel since the beam is not stationary on a single linear array of pixel but rather is scanned through a plurality of linear arrays.

There is thus provided, in accordance with a preferred embodiment of the invention, an imaging system for imaging a plurality of macropixels onto a media. The imaging system includes a light source for generating a beam of light; a projection lens assembly for focusing the beam of light; a deflector illuminated by the light beam output from the projection lens assembly, the deflector able to deflect the light beam in the vertical (Y-axis) direction; an anamorphic lens assembly illuminated with the light beam output from the deflector; a two dimensional spatial light modular (SLM) including a plurality of micropixels, the plurality of micropixels grouped together to form a plurality of linear arrays of the micropixels, and an imaging lens assembly coupled to the output of the spatial light modulator. The spatial light modulator controls the passage of light through each of the macropixels, the linear arrays being illuminated one at a time in sequential order. The imaging lens assembly images onto the media, a line spot on the deflector in the vertical (Y-axis) direction and the output of the spatial light modulator in the horizontal (X-axis) direction.

Furthermore, in accordance with a preferred embodiment of the present invention, each the linear array of the spatial light modulator once illuminated is written with macropixel information to be imaged during the next cycle. Each macropixel of the spatial light modulator includes an array of individually addressable micropixels, the micropixels able to be turned on or off so as to achieve any desired intensity pattern across the linear array of macropixels.

Furthermore, in accordance with a preferred embodiment of the present invention, the pattern achieves uniform illumination across the linear array of macropixels and/or the pattern provides a capability of adjusting a gray scale profile.

Additionally, in accordance with a preferred embodiment of the present invention, the spatial light modulator includes a digital mirror system, a deformable mirror device, a membrane mirror light modulator device, a liquid crystal device, a ferroelectric liquid crystal device or a mechanical active/anti-reflective device.

Furthermore, in accordance with a preferred embodiment of the present invention, the anamorphic lens assembly includes a cylindrical lens, the deflector includes an acousto-optic device or a rotating polygon.

Additionally, there is also provided, in accordance with a preferred embodiment of the invention, a method of generating a linear array of macropixels to be imaged onto a media utilizing a two dimensional spatial light modulator having a plurality of micropixels grouped together to form a plurality of linear arrays of macropixels. The method includes the steps of:

a) generating a beam of light;

b) focusing the beam of light;

c) deflecting the focused beam of light in accordance with a control signal;

d) providing an anamorphic lens assembly;

e) illuminating each of the linear arrays of the spatial light modulator one at a time in sequential order; and f) imaging, onto the media, the deflection of the focused beam of light in the vertical (Y-axis) direction and the output of the spatial light modulator in the horizontal (X-axis) direction.

Additionally, in accordance with a preferred embodiment of the present invention, the method further includes the step of writing pixel data to each the linear array of the spatial light modulator after being illuminated.

Furthermore, in accordance with a preferred embodiment of the present invention, the step of illuminating includes illuminating each the macropixel of the spatial light modulator as an array of individually addressable micropixels, the micropixels able to be turned on or off so as to achieve any desired intensity pattern across the linear array of macropixels.

Furthermore, in accordance with a preferred embodiment of the present invention, the pattern achieves uniform illumination across the linear array of macropixels and/or provides a capability of adjusting a gray scale profile.

BRIEF DESCRIPTION OF THE DRAWINGS

The invention is herein described, by way of example only, with reference to the accompanying drawings, wherein.

DETAILED DESCRIPTION OF THE INVENTION

For next generation imagesetters it is desirable that the imaging mechanisms be capable of generating a linear array of between approximately 50 and 300 dots in a short time period. The imaging system must be able to sustain a data input rate of on the order of 100 Mbps. A macropixel is the term given to a pixel that actually is composed of finer smaller pixels called micropixels. Thus, for example, each macropixel may comprise a 1×20 array of micropixels.

The approaches suggested by the prior art are not adequate to achieve a macropixel rate in the order of 100 Mbps without significantly increasing the number of pixels which is problematic from an optical and reliability point of view. In order to overcome the limitations of linear light valves, the present invention utilizes a two dimensional light valve or SLM to generate the linear array of dots in the image plane. This overcomes the limitations of the slow switching speed of SLMs which is in the order of 10 to 20 microseconds.

Figure 1:
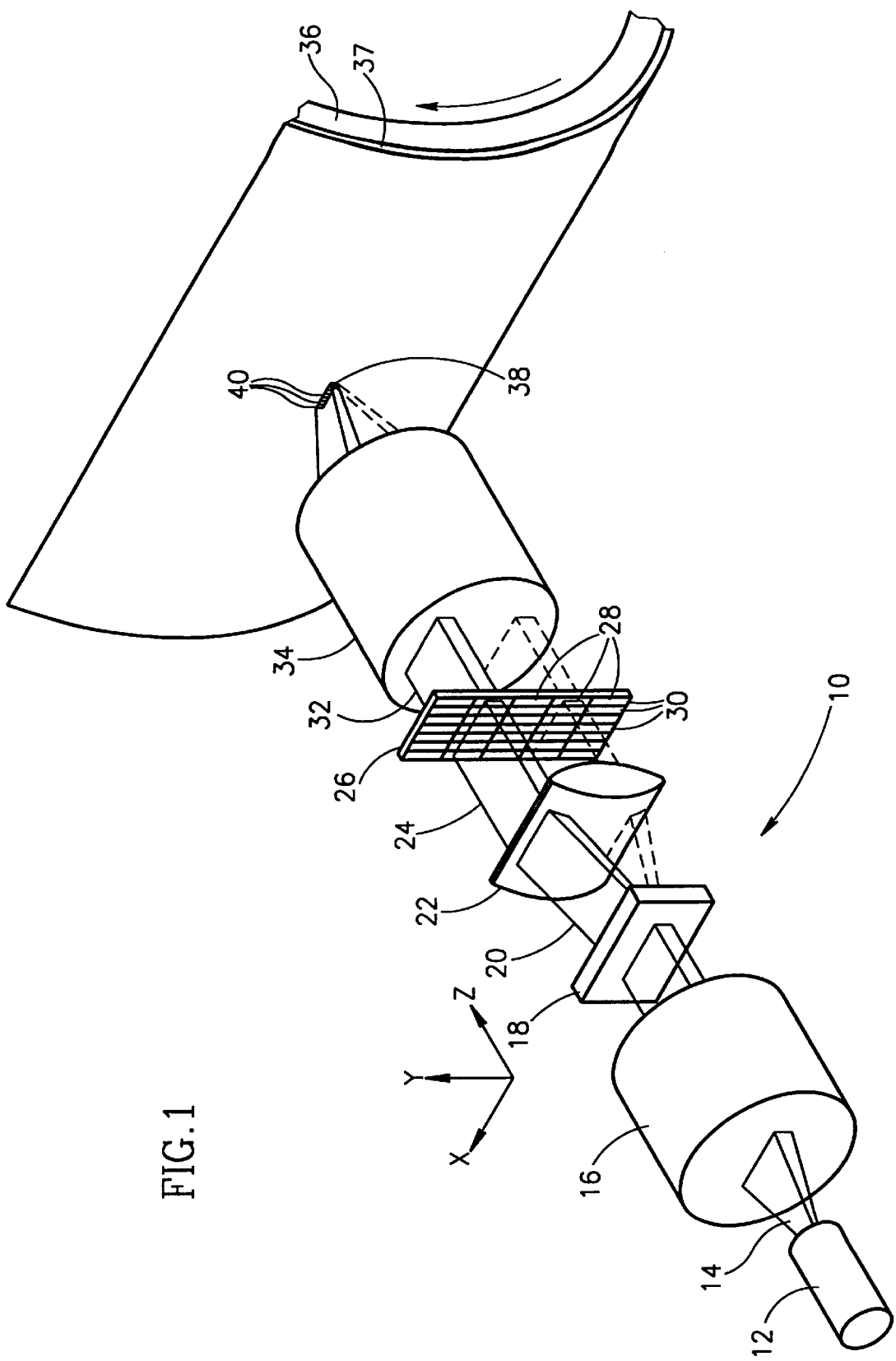
FIG. 1 is a schematic diagram illustration of an imaging system constructed in accordance with a preferred embodiment of the present invention that utilizes a light valve type of device.

A schematic diagram illustrating an imaging system, generally referenced 10, constructed in accordance with a preferred embodiment of the present invention, is shown in FIG. 1. The imaging system 10 comprises a light source 12 that may be any suitable light source with sufficient power output such as a laser diode, laser diode bar, etc. The output of the light source 12 is an unfocused light beam 14 that is input to a projection lens assembly unit 16. The projection lens assembly unit 16 functions to focus and shape the laser beam output so as to generate a rectangularly shaped line spot at the input to a deflector 18. The deflector 18 can be any suitable device functioning as a deflector to deflect the laser beam output over a sufficiently large angular span in accordance with an external control signal. Suitable devices include, for example, acousto-optic deflectors and rotating polygons. Acousto-optic deflectors use acoustic or sound energy to deflect the laser beam. More specifically, the frequency of the acoustic wave is varied to produce a corresponding variation in the character of the crystal. Varying the frequency of the acoustic wave will vary the acoustic grating's spatial frequency of the crystal, causing the laser beam to deflect.

The output beam 20 of the deflector 18 is input to a cylindrical lens assembly 22 which refracts light in the Y-axis direction but passes light unchanged in the horizontal or X-axis direction. The light beam 24 output from the lens assembly 22 illuminates the spatial light modulator (SLM) 26. SLM 26 is a two dimensional array of pixels organized by rows 28 and columns 30. Various types of SLMs may be used in the present invention, they include, but are not limited to, digital mirror devices (DMDs), deformable mirror devices (DMDs), membrane mirror light modulators (MLMs), liquid crystal arrays (LCs) and ferroelectric liquid crystal arrays (FLCs). Each row of the SLM comprises a linear array of macropixels that are ultimately to be imaged onto a media 37, attached to a rotating external drum 36. The linear array 38 of imaged pixels 40 are imaged onto the media 37 which may be, for example, a film sheet or a plate. The linear image 32 output by the SLM 26 is coupled onto the media 37 via anamorphic imaging lens assembly 34, which may comprise a cylindrical imaging lens assembly. The lens assembly 34 images the SLM 26 in the X-direction and together with lens assembly 22 images the deflector plane in the Y-direction.

Figure 2A:
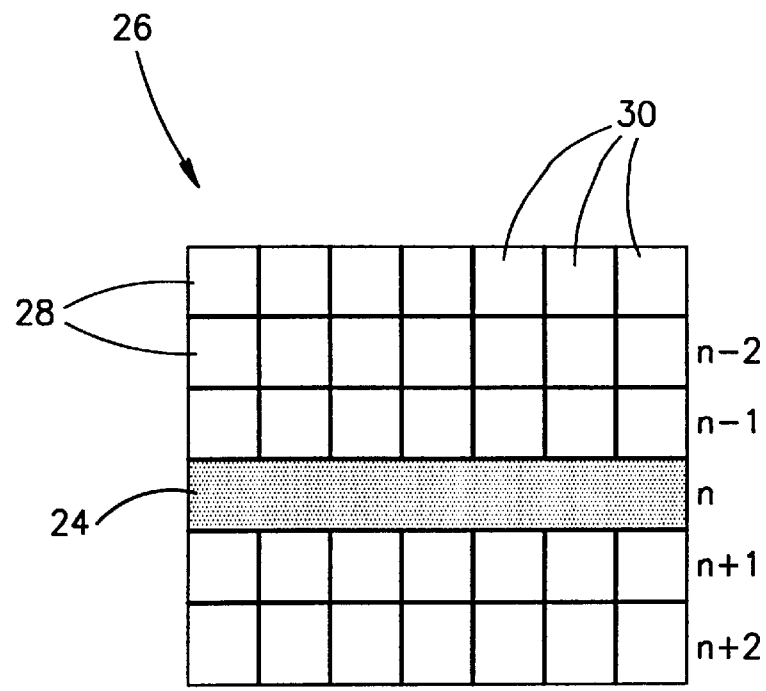
FIG. 2A illustrates in more detail row n of the spatial light modulator shown in FIG. 1 being illuminated.
Figure 2B:
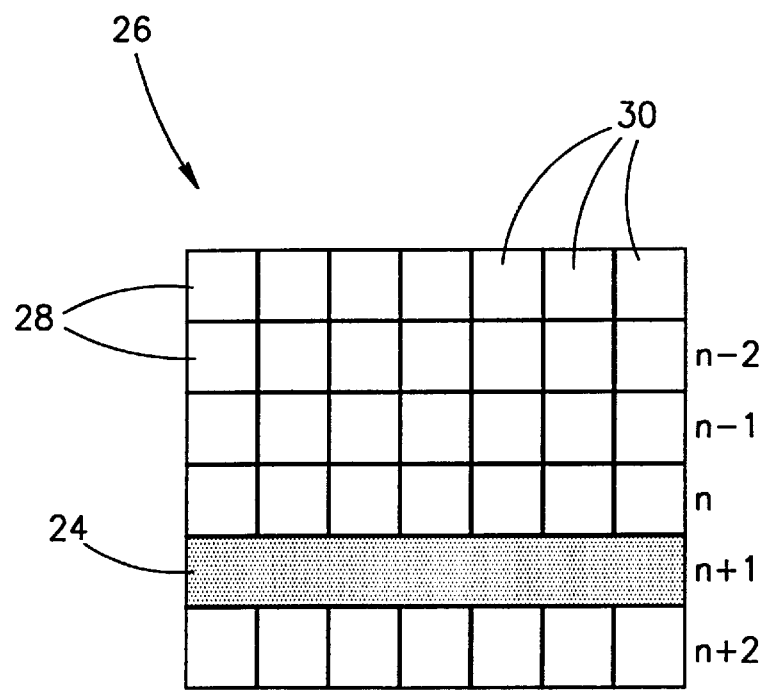
FIG. 2B illustrates in more detail row n+1 of the spatial light modulator shown in FIG. 1 being illuminated.

The lens assembly unit 16, the deflector 18 and the cylindrical lens assembly 22 are arranged so that the SLM 26 is uniformly illuminated in the X-axis direction. At any given moment, a single row 28, termed an imaging row, is being illuminated. FIGS. 2A and 2B illustrate in more detail the illumination of imaging rows of the spatial light modulator 26. In particular, FIG. 2A illustrates all the columns 30 of row n, referenced 24, being illuminated, as represented by the shaded area. Once the pixels within row n have been imaged for a sufficient time, the next row n+1, referenced 24 in FIG. 2B, is illuminated. The rows are illuminated in succession by activating the deflector 18 at a different frequency. Once the illuminating beam is deflected from row n to row n+1, the electrical switching of the pixels in the previous row n on the SLM can begin in accordance with the data that has to be exposed when the beam 24 is next directed on row n. Similarly, once row n+1 has finished being imaged, row n+2 can then be imaged and the switching of pixels in row n+1 can begin. Using a two dimensional SLM in a linear row by row cyclical fashion thus compensates for the slow switching speed of the SLM by allowing sufficient switching for individual pixels. Once during each cycle, each row is illuminated, after which pixel data is then written to it for the next cycle. For example, if a two dimensional SLM is organized into 10 rows of pixels, with each row having an exposure step of 2 microseconds, the write speed of the SLM is 18 microseconds, an order of magnitude slower than the speed at which the illumination is shifted from row to row. This speed is sufficiently slow enough to allow use of currently available SLM devices. If the imaging system can image a 200 pixel line onto the media at one time, this translates to a data rate of 100 Mbps. If the switching speed of the SLM is slower, the number of pixels simultaneously imaged must be increased or the number of rows of pixels must be increased in order to maintain the same speed.

Figure 3:
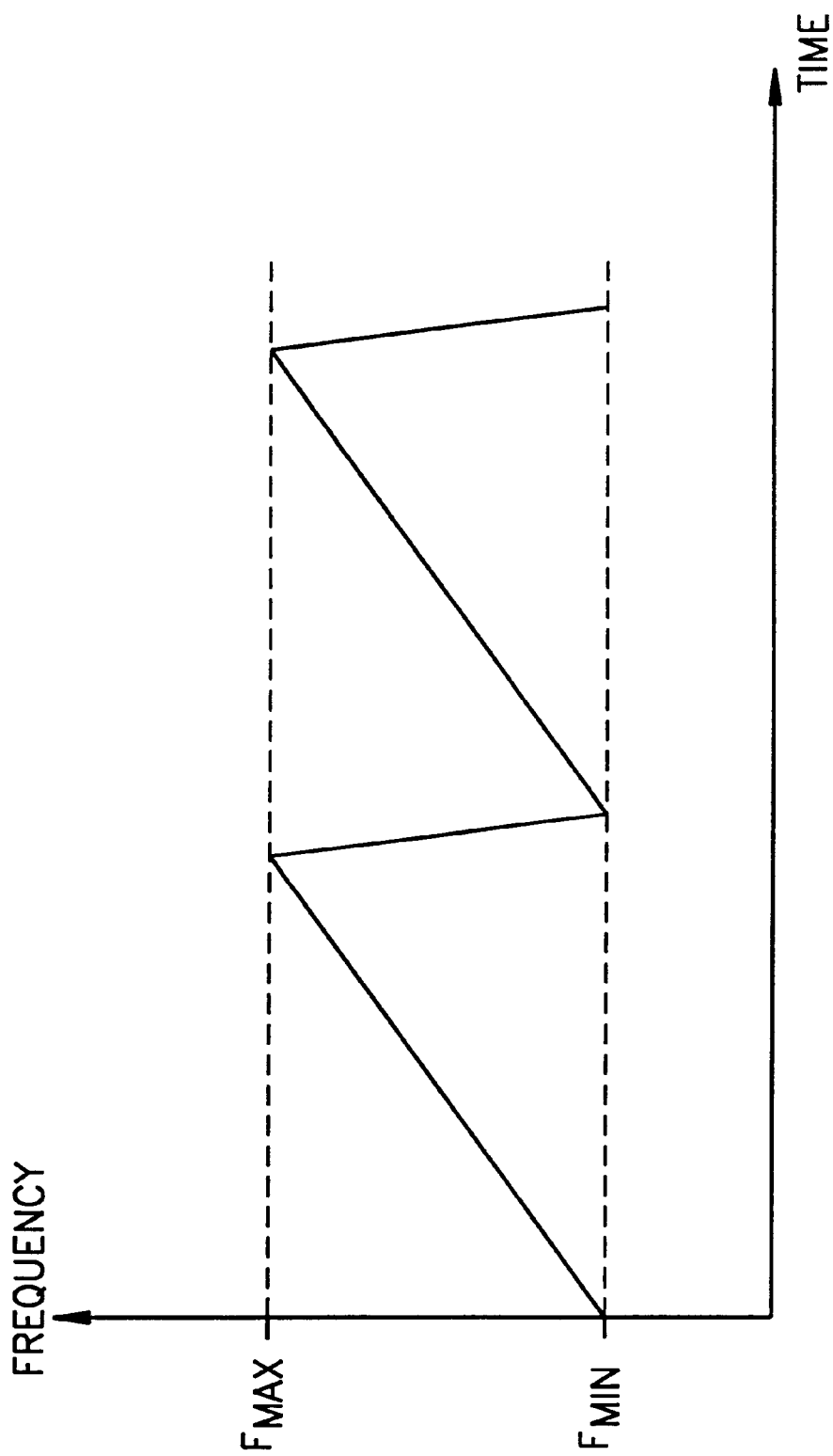
FIG. 3 is a diagram illustrating the frequency control signal input to the deflector as a function of time.

A diagram illustrating the frequency control signal input to the deflector as a function of time is shown in FIG. 3. To vary the deflection angle of the deflector, the frequency of the acoustic wave is varied with time from a minimum frequency to a maximum frequency. A ramp signal is applied to the deflector in order to cycle through each row of the SLM in sequential order. After the bottom most row of the SLM is imaged, the deflector beam must be brought back to the top most row. Thus, a relatively short time period is spent on the bringing the beam back to the top row of the SLM, as is apparent in the Figure. This time can be in the order of 25% of a pixel exposure time which is not enough to effect the imaging operation.

Figure 4:
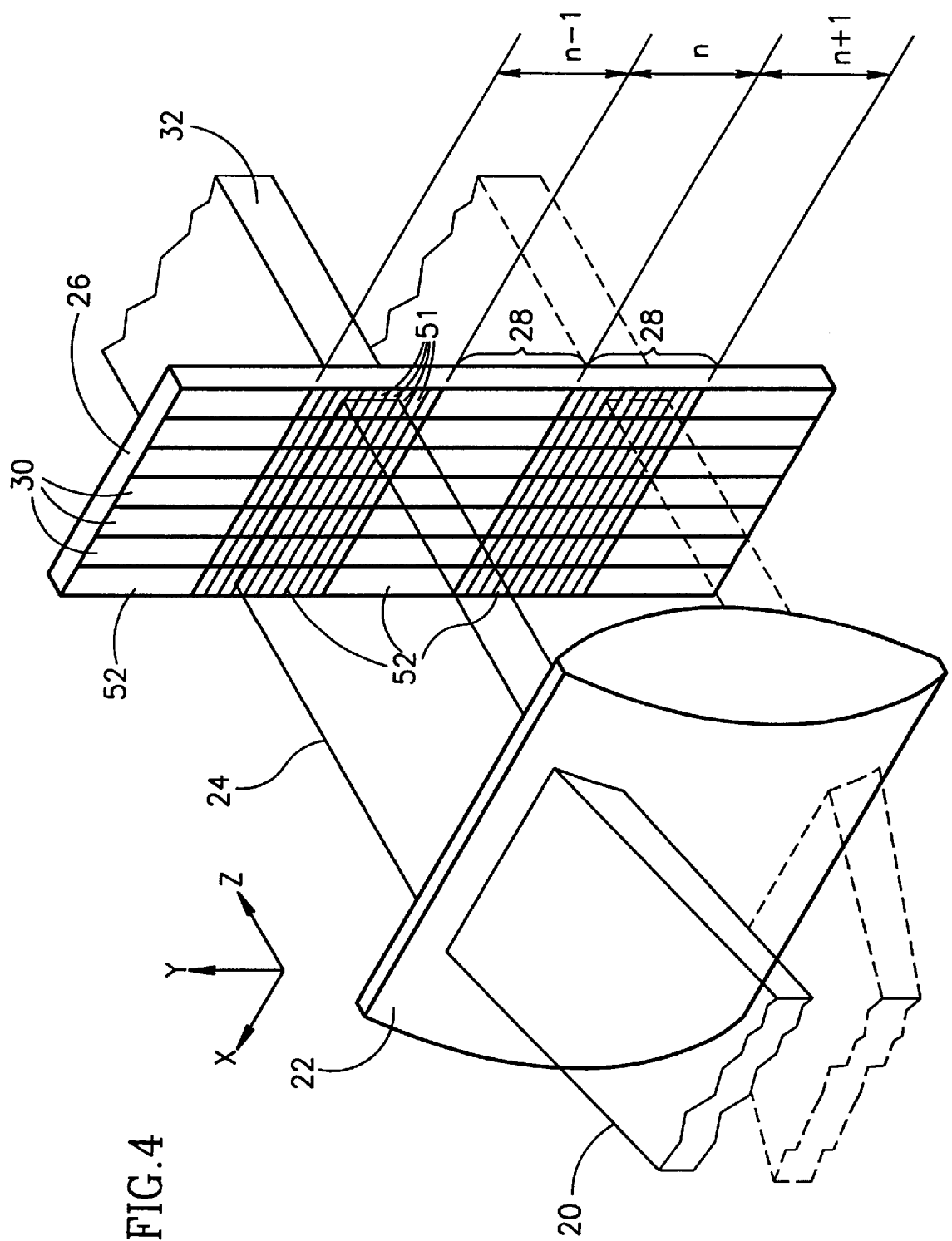
FIG. 4 is a schematic diagram illustration of the illumination of the spatial light modulator in more detail.

A schematic diagram illustrating the illumination of the spatial light modulator in more detail is shown in FIG. 4. Light beam 20 is output by the deflector and illuminates cylindrical lens assembly 22. Light in the vertical or Y-axis direction is refracted onto SLM 26. Commercially available SLMs suitable for use in the present invention include: Texas Instruments DMD (with VGA resolution of 640×480 pixels or 7064×64), CRL two dimensional ferroelectric liquid crystal (FLC) model 2DX320 and SLM model DR0256B or 10*10B manufactured by Displaytech. In addition, the SLM may comprise a membrane mirror light modulator, model W-MLM, manufactured by Optron Systems, Bedford, Mass. The SLM may also comprise a mechanically active/anti reflective device.

With reference to FIG. 4, SLMs that comprise thousands of pixels are arranged into rows 28 and columns 30 to form larger pixels, called macropixels 52 that are the basic unit of information that is imaged onto the media. Each macropixel 52 comprises rows forming smaller sized pixels 51 referred to as micropixels. Illustrated in FIG. 4 are three image pixel rows 28 labeled n−1, n and n+1. For clarity only rows n−1 and n+1 are shown with the micropixels 51 indicated.

The micropixels 51 are the basic addressable unit of the SLM. Each micropixel can be electronically turned on and off to either pass or block light. The term passing light is defined to mean the transmission of light for light valve type SLMs, reflection of light for mirror type SLMs or deflection of light for deflecting mirror type SLMs. The term blocking light is defined to mean the non-transmission of light for light valve type SLMs, non-reflection of light for mirror type SLMs or non-deflection of light for deflecting mirror type SLMs.

Pursuant to the present invention, each macropixel (i.e., imaged pixel) is divided into micropixels having only rows for the following reason. As described previously, the imaging system images the SLM in the X-direction and the deflector in the Y-direction. If macropixels included micropixels columns, the pattern imaged in the X-direction of each macropixel would be imaged onto the medium, which is undesirable. The rows of micropixels, on the other hand are not imaged onto the medium. The deflector and not the SLM is imaged in the Y-direction. Thus, the micropixels in the Y-direction are averaged together or smeared to form a single average intensity.

For SLMs wherein the switching of individually addressable pixels is between the on and off state, subdividing each macropixel into micropixels allows the dynamic range of the SLM to be controlled to a finer degree.

Figure 5:
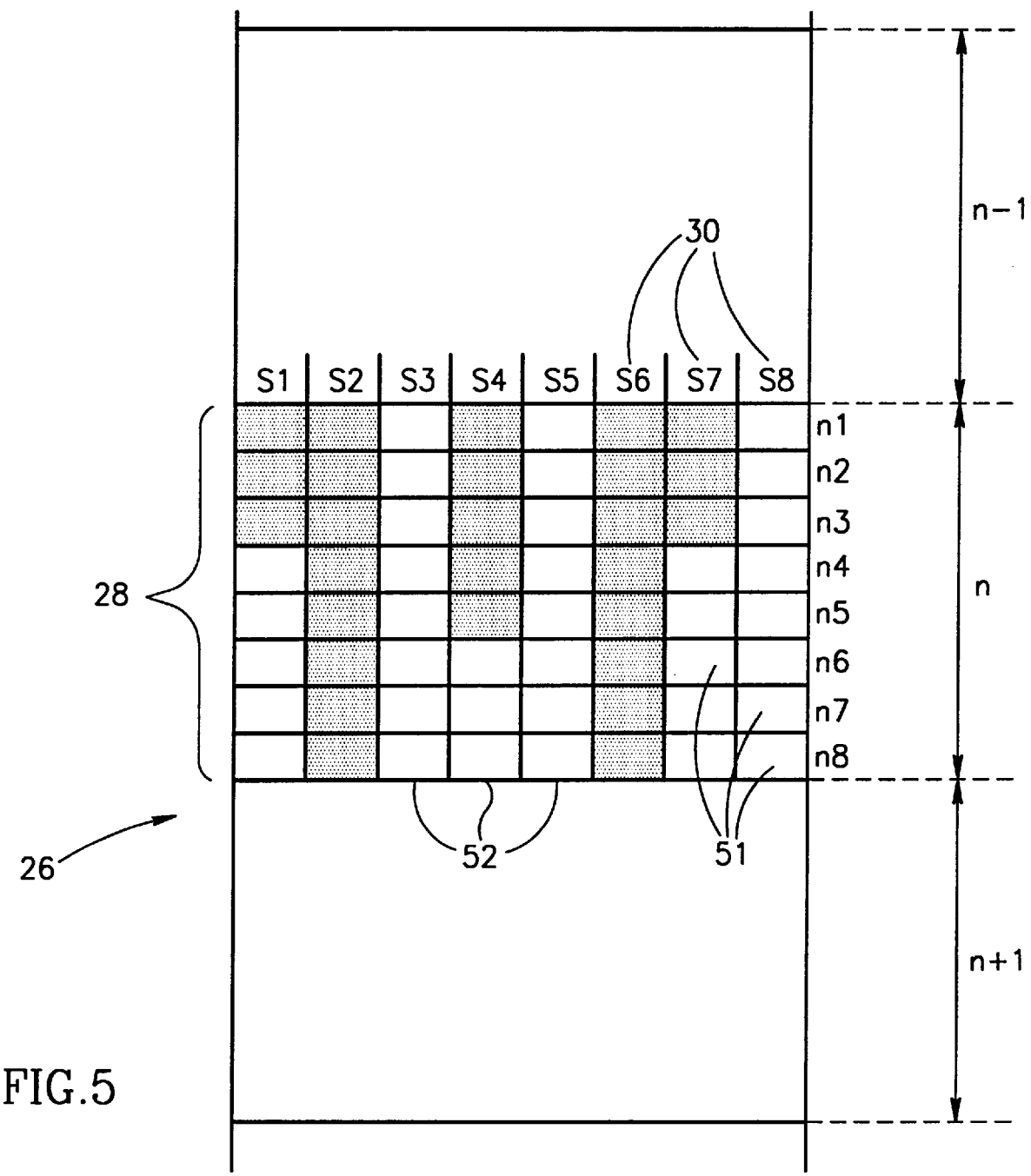
FIG. 5 illustrates a row of macropixels of the spatial light modulator displaying an alphanumeric character.

Illustrated in FIG. 5 is an imaging row 28 of macropixels 52 of the spatial light modulator displaying an arbitrary gray scale value or profile. Each column 30 or macropixel 52, labeled S1 through S8, comprises an array of eight micropixels 52, labeled n1 through n8. Row n is shown imaging an arbitrary gray scale profile. The shaded portions represent pixels that have been switched on meaning light is able to pass through (i.e., transmission, reflection or deflection) the SLM to the media. In this example, within each column 30 (i.e., S1, S2, etc.) of a macrorow 28 (i.e., n−1, n, n+1, etc.) each micropixel can transmit or block 12.5% of the energy falling on the column. In this example, each macropixel 52 comprises eight micropixels 51 or 12.5% of the energy. For the image shown in FIG. 5, in the image plane, the relative intensities of the micropixels 51 in row n is presented in the table below.

| | Column | | | | | | | |
|---|---|---|---|---|---|---|---|---|
| S1 | S2 | S3 | S4 | S5 | S6 | S7 | S8 |
| 37.5% | 100% | 0% | 62.5% | 0% | 100% | 37.5% | 0% |

The energy percentages given in the table above are for the case of an ideal system that does not have any losses and does not suffer from problems with illumination uniformity. Real world systems, however, will suffer from these problems to some extent. Using the imaging systems 10 of the present invention helps to correct illumination nonuniformity by allowing the control of the dynamic range of each macropixel. During a calibration or setup phase, the illumination uniformity of the pixels within each macrorow can be measured. Nonuniformities can be compensated for or equalized by turning selected micropixels making up each macropixel on or off. In addition, the ability to control the micropixels making up each macropixel provides the capability of achieving a much finer gray scale on the resultant image.

With reference to FIG. 1, cylindrical imaging lens assembly 34 may comprise one or more lens forming a lens assembly. Preferably the imaging lens assembly 34 utilizes anamorphic optics with lens 22 to image the laser beam which is deflected by the deflector 18 in the vertical or Y-axis direction and to image the particular row of pixels of the SLM in the X-axis direction. In the example imaging system presented in FIG. 1, the imaging lens assembly 34 functions to demagnify the image output by the SLM onto the media 37. In practice, however, an optical system may required the magnification of the image output by the SLM or may require a one to one characteristic without magnification or demagnification.

Figure 6:
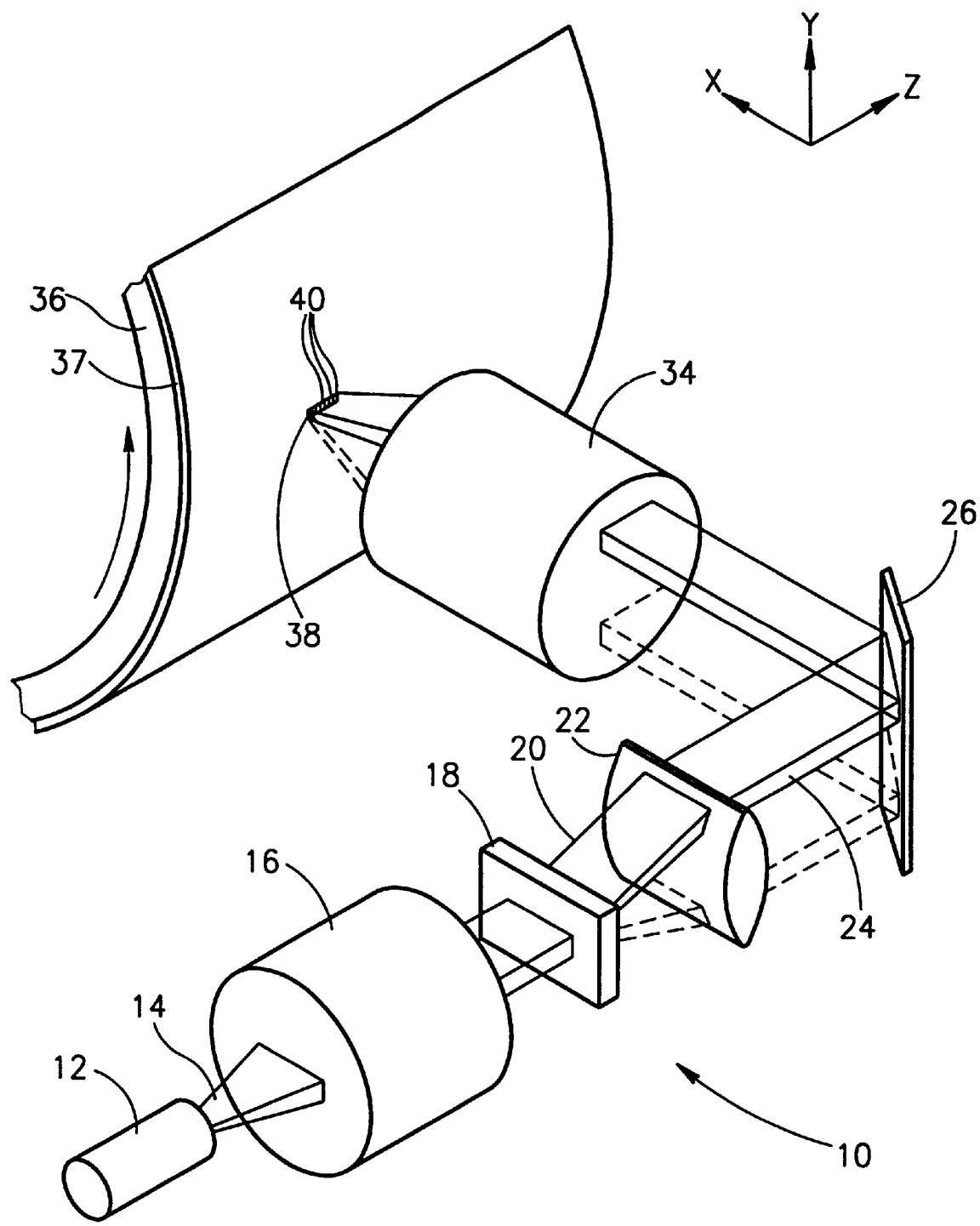
FIG. 6 is a schematic diagram illustration of an imaging system constructed in accordance with a preferred embodiment of the present invention that utilizes a DMD type device.

In accordance with the teaching of the present invention, a high level block diagram illustrating an imaging system that utilizes a mirror type SLM device is shown in FIG. 6. The principle of operation of this embodiment of the invention is exactly the same as that of the system presented in FIG. 1. The differences being that the SLM 26 is now a mirror type SLM such as a MLM or DMD, for example, that functions to reflect rather than pass light. These devices are similar in that they have two states, the reflection of light or the non-reflection of light. One skilled in the art could straightforwardly adapt the principles of the present invention to an imaging system that utilizes mirror type SLMs as the imaging device.

While the invention has been described with respect to a limited number of embodiments, it will be appreciated that many variations, modifications and other applications may be made.

What is claimed is:

1. An imaging system oriented about at least a vertical Y-axis and a horizontal X-axis for imaging a plurality of macropixels onto a light sensitive media, comprising:
    a light source for generating a light beam;
    a projection lens assembly for focusing said light beam;

a deflector configured for receiving said focused light beam and deflecting said focused light beam in a vertical (Y-axis) direction;

a two dimensional spatial light modulator (SI M) comprising a plurality of linear arrays of a plurality of macropixels, each of said adapted for holding data, said spatial light modulator configured for sequentially activating at least one macropixel of at least one of said linear arrays;

an imaging lens assembly in communication with said spatial light modulator;

said spatial light modulator, said deflector and imaging lens assembly configured for focusing a light beam to be deflected to positionally correspond to said at least one sequentially activated macropixel for its illumination by said light beam and imaging of said data of each of said sequentially Illuminated macropixels at different locations onto said light sensitive media.

2. The imaging system according to claim 1, wherein each said macropixel of said spatial light modulator comprises an array of individually addressable micropixels, said micropixels able to be turned on or off so as to achieve a desired intensity pattern across said linear array of macropixels.

3. The imaging system according to claim 2, wherein said desired pattern achieves uniform illumination across said linear array of macropixels.

4. The imaging system according to claim 2, wherein said desired pattern provides a capability of adjusting a gray scale profile.

5. The imaging system according to claim 1, wherein said spatial light modulator comprises a digital mirror system.

6. The imaging system according to claim 1, wherein said spatial light modulator comprises a deformable mirror device.

7. The imaging system according to claim 1, wherein said spatial light modulator comprises a membrane mirror light modulator device.

8. The imaging system according to claim 1, wherein said spatial light modulator comprises a liquid crystal device.

9. The imaging system according to claim 1, wherein said spatial light modulator comprises a ferroelectric liquid crystal device.

10. The imaging system according to claim 1, wherein said spatial light modulator comprises a mechanical active/anti-reflective device.

11. The imaging system according to claim 1, wherein said anamorphic lens assembly comprises a cylindrical lens.

12. The imaging system according to claim 1, wherein said deflector comprises an acousto-optic device.

13. The imaging system according to claim 1, wherein said deflector comprises a rotating polygon.

14. The imaging system of claim 1, additionally comprising, an anamorphic lens assembly for receiving said focused light beam from said deflector and projecting it onto said spatial light modulator.

15. An imaging system oriented about at least a vertical Y-axis and a horizontal X-axis for imaging a plurality of macropixels onto a light sensitive media, comprising:

a deflector configured for receiving a light beam and deflecting said light beam in a vertical (Y-axis) direction;

a spatial light modulator (SLM) with a plurality of arrays of a plurality of macropixels adapted for holding data, said SLM configured for activating each of said macropixels of at least one array in a sequential order during at least a portion of the time at least one macropixel of another array is being loaded with new data, and said spatial light modulator in communication with said deflector such that the light beam is detlected to positionally correspond to said sequentially activated macropixels for their illumination by said light beam, to write successive lines of information at different locations on said light sensitive media.

16. The imaging system according to claim 15, wherein each said macropixel of said SLM comprises an array of individually addressable micropixels, said micropixels able to be turned on or off so as to achieve a desired intensity pattern across said array of macropixels.

17. The imaging system according to claim 16, wherein said desired pattern achieves uniform illumination across said array of macropixels.

18. The imaging system according to claim 16, wherein said desired pattern provides a capability of adjusting a gray scale profile.

19. The imaging system according to claim 15, wherein said spatial light modulator comprises a digital mirror system.

20. The imaging system according to claim 15, wherein said spatial light modulator comprises a deformable mirror device.

21. The imaging system according to claim 15, wherein said spatial light modulator comprises a membrane mirror light modulator device.

22. The imaging system according to claim 15, wherein said spatial light modulator comprises a liquid crystal device.

23. The imaging system according to claim 15, wherein said spatial light modulator comprises a ferroelectric liquid crystal device.

24. The imaging system according to claim 15, wherein said spatial light modulator comprises a mechanical active/anti-reflective device.

25. A method for imaging a plurality of micropixels onto a light sensitive media utilizing a spatial light modulator (SLM) with arrays of at least one macropixel configured for storing data, said method comprising the steps of:

sequentially activating at least two macropixels during a least a portion of the time of loading data to at least one other macropixel of another array; and deflecting at least one light beam to positionally correspond to each of said sequentially activated macropixels to write successive lines of information, each of said successive lines of information having each successive macropixel written at different locations on said light sensitive media.

26. The method according to claim 25, wherein said step of imaging comprises imaging each said macropixel of said SLM as an array of individually addressable micropixels, said micropixels able to be turned on or off so as to achieve a desired intensity pattern across said array of macropixels.

27. The method according to claim 26, wherein said desired pattern achieves uniform illumination across said array of macropixels.

28. The method according to claim 26, wherein said desired pattern provides a capability of adjusting a gray scale profile.

* * * * *

UNITED STATES PATENT AND TRADEMARK OFFICE
CERTIFICATE OF CORRECTION

PATENT NO.     : 6,208,369 B1
DATED          : March 27, 2001
INVENTOR(S)    : Ben Oren, Ilan et al.

It is certified that error appears in the above-identified patent and that said Letters Patent is hereby corrected as shown below:

<u>Title page,</u>
Item [12], under the words United States Patent, please change to:
    Ben Oren et al.
Inventors: Ilan Ben Oren, Jerusalem; Serge Steinblatt, Ra'anana; Amir Komem, Tel Aviv, all of (IL)

Signed and Sealed this

Twenty-sixth Day of March, 2002

Attest:

*Attesting Officer*

JAMES E. ROGAN
*Director of the United States Patent and Trademark Office*